United States Patent [19]

Doljack et al.

[11] 4,450,496
[45] May 22, 1984

[54] PROTECTION OF CERTAIN ELECTRICAL SYSTEMS BY USE OF PTC DEVICE

[75] Inventors: Frank A. Doljack, Pleasanton; Lee M. Middleman, Portola Valley, both of Calif.

[73] Assignee: Raychem Corporation, Menlo Park, Calif.

[21] Appl. No.: 228,347

[22] Filed: Jan. 26, 1981

Related U.S. Application Data

[63] Continuation-in-part of Ser. No. 67,207, Aug. 16, 1979, abandoned.

[51] Int. Cl.³ .................. H02H 3/08; H02H 3/06
[52] U.S. Cl. ..................... 361/58; 361/106; 361/94; 338/22 R; 338/20; 219/212; 219/505
[58] Field of Search .............. 361/58, 106, 29, 27, 361/24, 31, 93, 165, 161; 338/23, 22 R, 20, 24, 232, 252, 295; 337/102, 105, 158; 219/505, 504, 212

[56] References Cited

U.S. PATENT DOCUMENTS

| | | |
|---|---|---|
| 2,978,665 | 4/1961 | Vernet et al. . |
| 3,209,206 | 9/1965 | Courtin ........................... 361/106 |
| 3,213,328 | 10/1965 | Ryckman, Jr. . |
| 3,241,026 | 3/1966 | Andrich ........................ 361/58 X |
| 3,243,753 | 3/1966 | Kohler . |
| 3,280,373 | 10/1966 | Dabinett ...................... 361/106 X |
| 3,396,265 | 8/1968 | Jacobson . |
| 3,418,454 | 12/1968 | Ryckman, Jr. . |
| 3,434,089 | 3/1969 | Waseleski, Jr. et al. . |
| 3,437,792 | 4/1969 | Lauck . |
| 3,444,399 | 5/1969 | Jones . |
| 3,489,883 | 1/1970 | McKinley ...................... 219/505 |
| 3,544,869 | 12/1970 | Plouffe et al. . |
| 3,614,345 | 10/1971 | Quinn .......................... 338/23 X |
| 3,667,026 | 5/1972 | Bogut et al. . |
| 3,745,369 | 7/1973 | Yamagata . |
| 3,814,899 | 6/1974 | Gordon, Jr. et al. . |
| 3,828,292 | 8/1974 | Grossman et al. ............ 338/23 X |
| 3,846,674 | 11/1974 | McNulty . |
| 3,872,418 | 3/1975 | Plough et al. ................. 338/23 |
| 3,916,264 | 10/1975 | Berg . |
| 3,965,392 | 6/1976 | Moorhead et al. ............ 361/29 |
| 3,979,708 | 9/1976 | Thompson . |
| 4,019,097 | 4/1977 | Miller et al. . |
| 4,101,862 | 7/1978 | Takagi et al. . |
| 4,132,863 | 1/1979 | Smith . |
| 4,198,562 | 4/1980 | Mills et al. . |
| 4,238,812 | 12/1980 | Middleman et al. ......... 219/505 X |
| 4,278,874 | 7/1981 | Cole ............................. 219/505 |

FOREIGN PATENT DOCUMENTS

| | | |
|---|---|---|
| 1912979 | 4/1965 | Fed. Rep. of Germany . |
| 1966342 | 10/1972 | Fed. Rep. of Germany . |
| 2331708 | 1/1975 | Fed. Rep. of Germany ...... 361/106 |
| 2821799 | 11/1978 | Fed. Rep. of Germany . |
| 2903418 | 8/1979 | Fed. Rep. of Germany . |
| 1164826 | 9/1969 | United Kingdom . |
| 1228628 | 4/1971 | United Kingdom . |
| 1309819 | 3/1973 | United Kingdom . |
| 1310129 | 3/1973 | United Kingdom . |
| 1445711 | 8/1976 | United Kingdom . |
| 2028608 | 5/1980 | United Kingdom . |
| 2047487 | 11/1980 | United Kingdom ............... 219/505 |

OTHER PUBLICATIONS

"The PTC Resistor" by Robert Blaha, Texas Instruments Inc., Proc. Electronic Components Conference, 1971.

*Primary Examiner*—Patrick R. Salce
*Attorney, Agent, or Firm*—Lyon & Lyon

[57] ABSTRACT

A PTC device is used to protect a power circuit from excessive heat and/or excessive current in an electrical system which comprises a separate control circuit as well as the power circuit. The PTC device is in one of said circuits and is thermally coupled to a resistive element in the other of said circuits. A preferred means for thermally coupling these two components is a metal strap which at least partially encircles the resistive element and extends over at least a portion of the surface of the PTC device.

8 Claims, 4 Drawing Figures

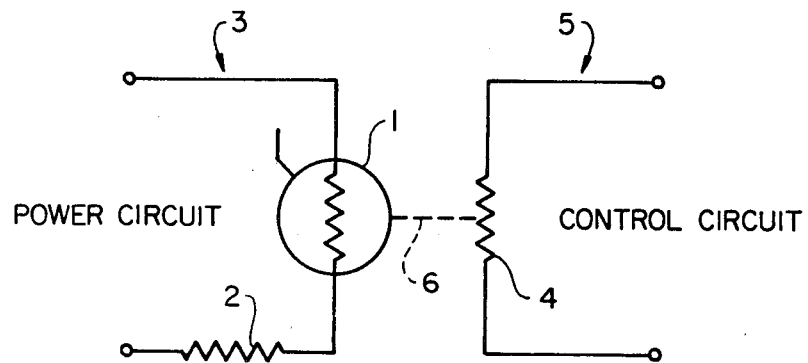
FIG_1
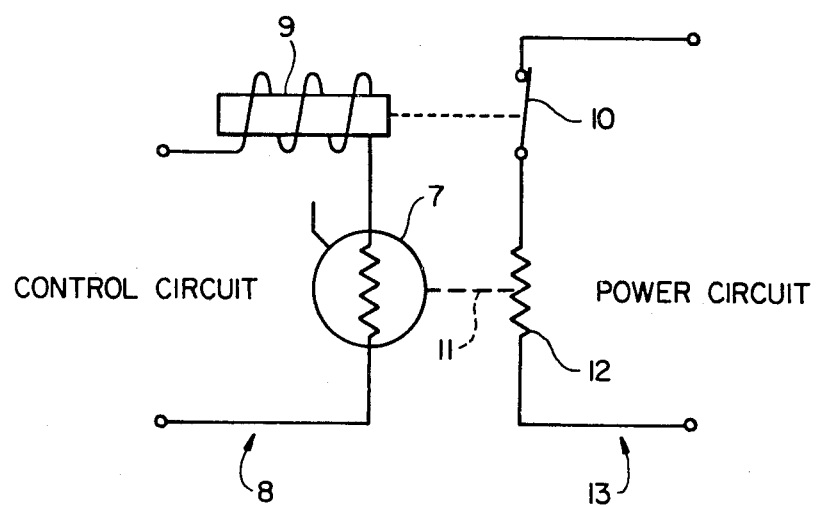
FIG_2

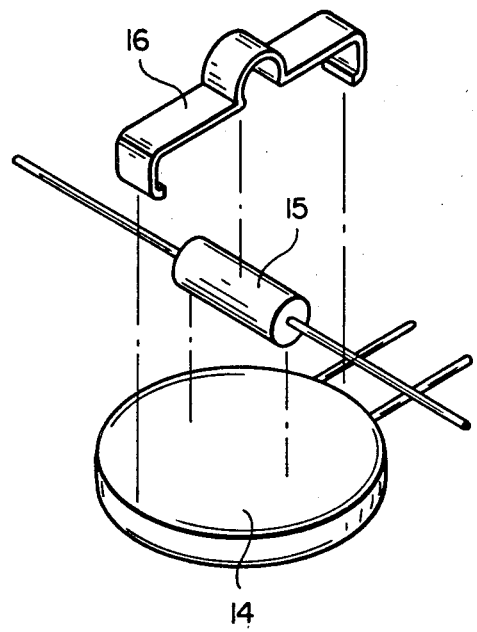
FIG_3
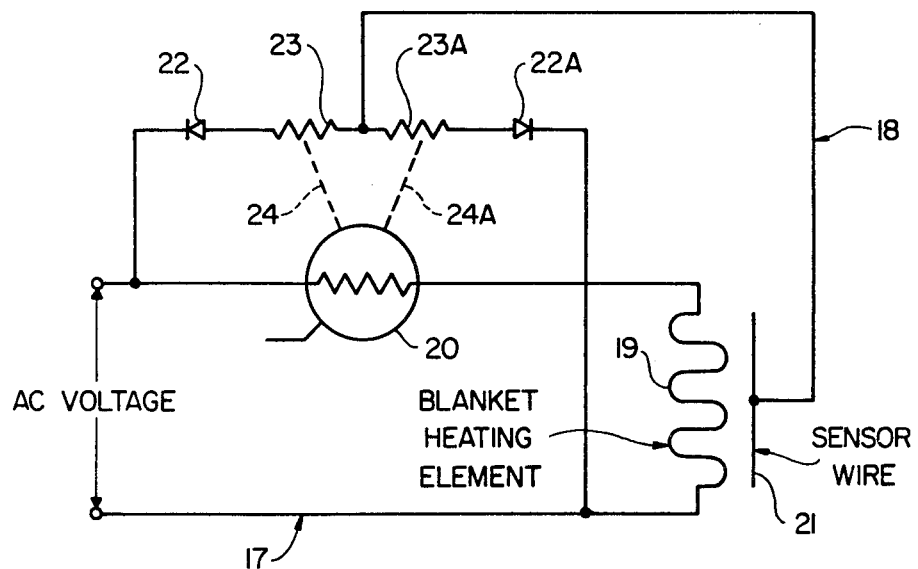
FIG_4

PROTECTION OF CERTAIN ELECTRICAL SYSTEMS BY USE OF PTC DEVICE

CROSS-REFERENCE TO RELATED APPLICATION

This application is a continuation-in-part of our application Ser. No. 67,207 filed Aug. 16, 1979, now abandoned, the disclosure of which is incorporated herein by reference. It is also related to another continuation-in-part of our application Ser. No. 67,207, Ser. No. 228,348, filed Jan. 26, 1981; and now abandoned.

BACKGROUND OF THE INVENTION

This invention relates to an electrical system comprising a power circuit and a control circuit wherein a PTC device is in one of the circuits and is thermally coupled to a resistive element in the other of said circuits. The PTC device protects the power circuit from excessive heat, current or both depending on the particular electrical system employed.

The term PTC device is used to describe an electrical device which undergoes a sharp increase in resistance, changing from a low resistance to a high resistance state, when the temperature of the device rises above a certain temperature. The use of certain PTC devices as circuit protection devices is disclosed in copending and commonly assigned application Ser. No. 965,344 of Middleman et. al., filed Dec. 1, 1978. The PTC devices of Ser. No. 965,344 are comprised of certain conductive polymer PTC compositions and possess specified characteristics which make them particularly useful in current protection applications. Use of other conductive polymer compositions in circuit protection devices has been proposed in the literature, for example in U.S. Pat. Nos. 2,978,665 (Vernet et. al) and 3,243,753 (Kohler). Ceramic PTC devices, for example, doped barium titanate devices, are also disclosed in the prior art to be capable of use as circuit protection devices (see for example, the article entitled "The PTC Resistor" by R. F. Blaha, in Proceedings of the Electronic Components Conference, 1971). Use of doped ceramic PTC devices in this manner is limited to low power circuits since doped ceramic devices typically have resistances greater than 2 ohms and cannot carry currents in excess of 500 milliamps. Use of a PTC device of either general type, as described in the prior art, contemplates use of the device in electrical series wih the load it is designed to protect. Excessive current through the circuit causes the device to heat by $I^2R$ heating to above the temperature at which it changes to a high resistance state, thereby reducing current through the load. The device will also change to a high resistance state if the temperature of the device climbs above a certain temperature due to factors other than excessive current, eg. an increase in ambient temperature. The device stays in the high resistance state, effectively limiting current, until the device cools to temperatures at which it will revert to a low resistance state or, in the case of certain devices, until power is disconnected to the circuit and the device permitted to cool.

In certain electric apparatus it is not feasible or is impracticable to locate a current limiting device immediately adjacent the load where excessive heat might develop. In such cases a separate control circuit can be used. The control circuit usually includes a temperature-sensitive element, such as a thermistor, thermostat or thermocouple positioned next to the load, and means for limiting the current to the power circuit. Current limiting means that can be used include, for example, a thermal fuse, or an electrical or electronic switching device. In such control systems the current limiting means can be located remote from the power circuit to be protected as long as it is electrically connected therewith.

SUMMARY OF THE INVENTION

It has now been discovered that a PTC device can be used in an electrical system comprising a power circuit and a control circuit to effectively limit current to the power circuit if a fault condition occurs. The PTC device can be in electrical series with a load in the power circuit or it can be in the control circuit, depending on the electrical system to be protected. The PTC device is thermally coupled to a resistive element in the other circuit. At least under normal operating conditions of the system, the two circuits will generally be separate from each other, i.e. have no electrical contact at all with each other. The fault condition can be a current overload and/or excessive heat depending on the electrical apparatus to be protected. Such a fault condition can cause irreparable damage to other electrical components in the system and, in extreme cases, can lead to fires.

In one aspect, this invention provides an electrical system comprising:
(a) a power circuit comprising a load;
(b) a control circuit which includes at least one resistive element, and the current through which becomes significant when a fault condition occurs in the power circuit;
(c) a PTC device which is connected in series with said load in said power circuit, said PTC device being a low temperature low resistance state under normal steady state operating conditions of the system and being thermally coupled to said resistive element of said control circuit, whereby heat generated in said resistive element when significant current flows through the control circuit as a result of a fault condition in the power circuit rapidly raises the temperature of the PTC device, causing the PTC device to change to a high resistance state thus substantially reducing the current through said load in the power circuit; and
(d) means for connecting said power circuit to a direct current or an alternating current power source.

In another aspect, this invention provides an electrical system comprising:
(a) a power circuit which includes a switch and at least one resistive element which generates heat when a fault condition causes excessive current to flow through the power circuit;
(b) a control circuit which includes a relay or other means for controlling the switch in the power circuit;
(c) a PTC device in the control circuit, said PTC device being in a low temperature low resistance state under normal steady state operating conditions of the system and being thermally coupled to said resistive element of said power circuit, whereby heat generated in said resistive element when excessive current flows through said power circuit raises the temperature of said PTC device, causing the PTC device to change to a high resistance state, thus activating the relay to open the switch in the power circuit;

(d) means for connecting said power circuit to a direct current or an alternating current power source; and (e) means for connecting said control circuit to a direct current or alternating current power source.

A preferred embodiment of this invention is an electrical system for an electric blanket comprising:

(a) a power circuit which includes a heating wire running throughout the blanket;

(b) a control circuit which includes at least one resistive element and a sensor wire which runs throughout the blanket adjacent said heating wire and separated therefrom by an insulation material having a negative temperature coefficient of resistance, such that at temperatures above normal operating temperatures of the blanket the material becomes sufficiently conductive to permit significant current to flow from said heating wire to said sensor wire and thus through said control circuit;

(c) a PTC device in said power circuit connected in series with said heating wire, said PTC device being thermally coupled to said resistive element of said control circuit, whereby heat generated in said resistive element when significant current flows through said control circuit raises the temperature of said PTC device causing said PTC device to change to a high resistance state, thus substantially reducing the current through said heating wire in said power circuit; and (d) means for connecting said power circuit to a direct current or alternating current power source.

BRIEF DESCRIPTION OF THE DRAWINGS

FIG. 1 is a schematic drawing showing one aspect of the invention wherein a PTC device is in electrical series with a load in a power circuit and is thermally coupled to a resistive element in a control circuit.

FIG. 2 is a schematic drawing showing a second aspect of the invention wherein a PTC device is in a control circuit and is thermally coupled to a resistive element in a power circuit.

FIG. 3 illustrates a preferred thermal coupling means used in accordance with this invention. Specifically, FIG. 3 is an exploded view of a metal strap which mechanically and thermally couples a resistive element to a PTC device.

FIG. 4 is a schematic drawing of a preferred embodiment of the invention wherein a PTC device is in the power circuit of an electric blanket and is thermally coupled to a resistive element in a control circuit.

DETAILED DESCRIPTION OF THE INVENTION

The PTC device that can be used in the practice of this invention comprises a device which exhibits a sharp increase in resistance when the temperature of the device increases significantly above temperatures it will encounter under normal operating conditions. Normal operating temperatures will usually be in the range of about $-40°$ C. to about 70° C. depending on the electrical system and the environment in which it is used. The PTC device selected for a given electrical system should preferably change from a low resistance state to a high resistance state whenever the temperature of the device exceeds about 10° C. above the normal operating temperature of that system. In general, the PTC device should have a resistance at the normal operating temperatures of the system of about 0.01 to about 1.0 ohms, preferably about 0.05 to about 0.5 ohms. The resistance of the device at normal operating temperatures and below is referred to in this specification as the low resistance state. In this resistance state, the PTC device has little effect on the current in the system.

To protect the system when a fault condition develops (excessive temperature, current or both depending on the system) the PTC device must change from the low resistance state to a high resistance state. When the PTC device is at a high resistance state, the resistance of the device must be sufficiently high to substantially limit current through the load with which the PTC device is electrically connected in series or to activate the relay. In general, at a high resistance state, the resistance of the PTC device should be in the range of about 10 kilohms to about 60 kilohms.

PTC devices which can be used include ceramic devices, such as doped barium titanate PTC devices, and PTC devices containing a PTC element comprised of a polymeric material containing a conductive filler. Typically, the PTC element of such devices comprise an organic polymer having dispersed therein conductive particles, such as carbon black, metal powders, metal oxides, inorganic salts or graphite. The conductive polymer PTC element is in contact with at least two electrodes such that current through the device flows from one electrode to another through at least a portion of the PTC element. Preferred PTC devices for use in the practice of this invention are disclosed in the above-mentioned U.S. patent application Ser. No. 965,344 of Middleman et al, filed Dec. 1, 1978. The PTC devices of Ser. No. 965,344 are preferably comprised of low resistivity conductive polymer PTC compositions disclosed in Ser. No. 965,343 of van Konynenberg et al filed Dec. 1, 1978 (now U.S. Pat. No. 4,237,441). Particularly preferred PTC devices include an oxygen barrier layer as disclosed in Ser. No. 965,345 of Middleman et al (now abandoned in favor of continuation-in-part application Ser. No. 98,711). The disclosures of these patent applications are hereby incorporated by reference. Such preferred devices have relatively low resistance and small mass thus enabling them to carry higher currents than doped ceramic PTC devices of similar size and to respond more rapidly to a change in current or temperature caused by development of a fault condition in the circuit. A particularly preferred PTC device of the above-mentioned U.S. patent applications of Middleman et. al. consists of a circular PTC element of about 0.75 inch in diameter and 0.08 inch thick with an electrode of nickel plated copper mesh or pure nickel mesh, embedded in each face. The PTC element of this device is preferably a dispersion of carbon black in a blend of high density polyethylene and an ethylene/acrylic acid copolymer.

An electrical system in which a PTC device can be used in accordance with this invention comprises a power circuit and a control circuit which contains at least one resistive element which generates heat when significant current flows through the control circuit. Thus the control circuit is one in which no current or a relatively low current flows under normal operating conditions of the system but in which a relatively high current flows when a fault occurs. FIG. 1 illustrates such a circuit. In this system, the PTC device, 1, is in electrical series with load, 2, in the power circuit, 3, and is thermally coupled to resistive element, 4, in the control circuit, 5. The PTC device, 1, is thermally coupled to resistive element, 4, by thermal coupling means, 6, represented by dotted lines.

The PTC device can be physically located at some point remote from the load in the power circuit as long as it is electrically connected in series therewith. This permits location of the PTC device in a remote control box, if desired. The PTC device is thermally coupled to the resistive element of the control circuit. When significant current flows through the control circuit, heat generated in the resistive element is transferred to the PTC device. When the PTC device reaches a certain temperature, depending on the particular PTC device, it changes to a high resistance state, thus substantially reducing current through the power circuit. The PTC device will also change to a high resistance state if the temperature of the environment surrounding the PTC device, e.g., of the control box, rises above this temperature. The PTC device will also protect the power circuit from excessive current flowing through the power circuit. When excessive current flows through the circuit, heat generated in the PTC device will increase above the rate at which such heat can be dissipated in the surrounding environment. This results in the temperature of the PTC device rising thus causing the PTC device to change to a high resistance state.

As discussed above, after the PTC device has changed to a high resistance state, it will remain in the high resistance state until it has cooled to below the temperature at which it changes to a high resistance state or, in some PTC devices, until it has been disconnected from the power source and allowed to cool. In the practice of this invention, it is preferred to use a PTC device which "latches", i.e., remains in a high resistance state until disconnected from the power source and allowed to cool. When the PTC device has returned to a low resistance state, the electrical system can again function under normal operating conditions, if the cause of the fault condition has been corrected.

Another electrical system in which a PTC device can be used in accordance with this invention, comprises a power circuit which includes a switch and at least one resistive element and a separate control circuit which includes a switch-controlling means, e.g. a relay. It is known to use a thermistor in the control circuit of electrical systems of this type. In the practice of this invention a PTC device in the control circuit is thermally coupled to a resistive element in the power circuit, preferably by a metal strap which at least partially encircles the resistive element and extends over at least a portion of the surface of the PTC device. FIG. 2 illustrates such a circuit. During normal operation of the system, current flows through the control circuit energizing the relay which retains the switch in the power circuit in closed position. In FIG. 2 a PTC device, 7, is placed in the control circuit, 8, in series with the relay, 9, which retains switch, 10, in closed position when current flows through relay. Under normal operating conditions, the PTC device, 7, is in a low resistance state and has little effect on current flowing through the control circuit, 8. The PTC device, 7, is thermally coupled by thermal coupling means, 11, to the resistive element, 12, in the power circuit, 13. When excess current flows through the power circuit, 13, heat is generated in the resistive element, 12, and transferred to the PTC device, 7, raising its temperature and causing it to change to a high resistance state. When the PTC device, 7, in a high resistance state, current in the control circuit, 12, is substantially reduced. As a result, the relay, 9, is de-energized, thereby causing switch, 10, of the power circuit, 13, to open. The excessive current in the power circuit, 13, is thus shut off, preventing damage to the components of the power circuit. The PTC device will remain in the high resistance state until it has cooled or until power to the control circuit has been disconnected and the device cooled, depending on the particular PTC device used.

Other relays can be used in the control circuit of electrical systems of this type. Some relays will operate to hold the switch of the power circuit closed while no significant current flows through the relay and will activate to open the switch when significant current flows through the relay. In this case, use of a PTC device to protect a power circuit in accordance with this invention will require that the PTC device be in parallel with the relay. When the PTC device changes to a high resistance state, more current will flow through the relay, causing it to activate to open the switch in the power circuit.

A somewhat similar electrical system is disclosed in U.S. Pat. No. 3,213,328 to W. D. Rychman. The system disclosed in this patent contains a temperature sensor device which includes a pair of conductors in contact with and separated by a layer of material having a negative temperature coefficient of resistance, employs a special relay to operate a switch in the power circuit, and can be used only in an alternating current circuit. The conductors and said layer of the temperature sensor device can be connected in parallel with one of the coils of said relay or the conductors can be connected in series with the coil and said layer is connected in parallel with the coil. In contradistinction, this invention utilizes a PTC device the control circuit along with the relay which will generally be a single coil relay. Further, the electrical system protected can be a direct current or an alternating current system.

As discussed above, the PTC device is in one circuit and is thermally coupled to a resistive element in the other circuit. The protective effect of the PTC device results from it changing to a high resistance state when its temperature is raised sufficiently by heat generated in the resistive element as a result of a fault condition developing. It is therefore important that the heat from the resistive element be transferred rapidly to the PTC device before damage to the system or to the resistive element can occur. In most systems, the PTC device should be heated to the temperature at which it changes to a high resistance state within about 5 minutes, preferably within about 2 minutes, after the fault condition occurs. In order to achieve sufficient heating of the PTC device within the necessary time, the PTC device is thermally coupled to the resistive element. The PTC device can be thermally coupled to the resistive element by various means such as heat sink compositions, for example, heat conductive resins and greases, such as, silicone or epoxy resins containing a heat conductive filler. The heat sink composition is applied at the interface between the PTC device and resistive element which can be, for example, adhesively bonded together or physically held together by encapsulant such as a heat conductive epoxy resin encapsulant, or mechanically held together by any other suitable means.

A particularly preferred thermal coupling means is a metal strap which mechanically and thermally couples the resistive element, or resistor, to the PTC device. FIG. 3 is an exploded view illustrating use of a metal strap to mechanically and thermally couple a resistive element, or resistor, to a PTC device. In FIG. 3, a PTC device, 14, is thermally coupled to resistor, 15, with metal strap, 16. A metal strap is preferred as thermal coupling means as it provides optimum heat transfer efficiency from the resistor to the PTC device. This ensures that the temperature of the PTC device is rapidly increased causing it to change to a high resistance state, and thus limit current through the system before damage to other circuit components can occur. The high heat transfer efficiency of the metal strap also prevents overheating of the resistor thereby preventing irreparable damage to the resistor.

The resistive element thermally coupled to the PTC device may be a component which is essential to the normal operation of the electrical system. Alternatively, and often preferably, the resistor may be one which is inserted into the second circuit for the specific purpose of sensing a fault condition and which is unimportant to the normal operation of the system. In the interests of using a resistor of small resistance, size and cost, the resistor is preferably one which has a power rating (or "rated dissipation") of at most 3 watts, especially at most 1 watt, measured by the procedures recommended by the International Electrotechnical Commission (see for example pages 13, 35 and 37 of IEC Publication No. 115-1). Such resistors are for example carbon composition, carbon film or wire-wound resistors, typically tubular components of circular cross-section with diameters of 1.5 to 12 mm and lengths from 3 to 50 mm, or alternatively of rectangular or square cross-section. The physical dimensions and power rating of typical resistors are given in the following table.

| Dimensions (mm) | | |
| --- | --- | --- |
| length | diameter | Power (watts) |
| Carbon Film or Carbon Composition Resistors | | |
| 3.7 | 1.6 | ⅛ |
| 6.4 | 2.3 | ¼ |
| 9.0 | 2.8 | ½ |
| 9.5 | 3.5 | ½ |
| Wire Wound Resistors | | |
| 9.4 | 3.2 | 1 |
| 10.3 | 5.6 | 2 |
| 14.3 | 6.4 | 3 |
| 23.8 | 8.7 | 5 |
| 46.8 | 10.3 | 10 |

PTC devices are also available in varying sizes. Preferred PTC devices for use in accordance with this invention comprise a pair of electrodes and a conductive polymer PTC element. Such PTC devices are usually circular, rectangular or square components which typically range in the major dimension from squares of 12 millimeters × 12 millimeters to circles of 20 millimeters in diameter. However PTC devices can be larger or smaller than this range. The devices are usually relatively thin, for example, approximately 5 millimeters thick.

Typically, for use with a metal strap thermal coupling means, the ratio of the cross-sectional dimension of the resistor to the major dimension of the PTC device will be in the range of about 2.00 to about 0.05. The metal strap coupling the resistor to the PTC device should preferably make contact with at least about 7 percent of the total surface area of the PTC device for sufficiently rapid heating of the PTC device. However, it may be found to be desirable for the metal strap to contact at least about 20 percent of the total surface area of the PTC device. The greater contact area transfers a greater amount of heat rapidly from the resistor, preventing overheating of the resistor and subsequent irreparable damage.

The metal used should have high thermal conductivity and should be sufficiently ductile to be formed to the desired shape to at least partially encircle the resistor and extend over at least a portion of the surface of the PTC device. Preferred metals for this purpose are copper, silver, aluminum, gold and alloys of these metals with each other and with other metals.

An electrical system typical of those that can be protected with a PTC device in accordance with this invention, is an electrical system used in certain electric blankets. In this system a heating wire runs throughout the area of the blanket to be heated. A sensor wire runs alongside the heating wire and is separated from it by an insulation material which has a negative temperature coefficient of resistance, i.e. the electrical resistance of the material decreases as the temperature increases. Such insulation materials are well known, such as, for example, plasticized polyvinyl chloride containing a minor amount of tetrabutylammonium picrate. The particular insulation material used will be selected so that at normal operating temperatures of the blanket the resistance of the material is sufficiently high that no significant current passes from the heating wire to the sensor wire. However, when an overtemperature condition develops at any part of the blanket, the resistance of the material must decrease sufficiently to permit significant current to flow from the heating wire to the sensor wire. Control systems of this general type and their use in electric blankets are disclosed in U.S. Pat. Nos. 3,213,328, 3,396,265, 3,418,454, 3,437,792 and 3,814,899.

The sensor wire forms part of the control circuit which also includes at least one resistive element, preferably at least two. The resistive element generates heat when significant current flows through the control circuit. The resistive element heats in response to current flowing through the control circuit, and thus there is no need for it to be located within the blanket and it is usually located in the control box. One known manner of utilizing such a system to protect the blanket from excessive heat provides a thermal fuse in the power circuit, located in the control box adjacent the resistive element of the control circuit. When current flows through the control circuit, the fuse melts, shutting off current to the blanket. The fuse must then be replaced before the electric blanket can continue to be used. Replacement of the fuse usually necessitates return of the blanket to the manufacturer. Use of a PTC device in accordance with this invention protects the blanket from overheating and since the PTC device reverts to a low resistance state on cooling, or on being disconnected from the power source and permitted to cool, no service return for replacement of components is required.

At normal operating temperatures of the blanket, the temperature of the control box is generally about 50–60 C. At this temperature the PTC device will be in a low resistance state, preferably of about 0.1 to 0.2 ohms and current will flow through the power circuit to the heating wire of the blanket. When any part of the blanket overheats, current flows through the control circuit and the resistive element. The PTC device is thermally coupled to the resistive element, preferably with a metal strap, and the temperature of the PTC device will rapidly rise to about 83–95 C., causing the PTC device to change to a high resistance state, preferably of about 10 kilohms to 40 kilohms, thereby substantially reducing the current to the heating wire of the blanket. The PTC device will remain in the high resistance state until cooled to below the temperature at which it changes to a high resistance state or, preferably, until power to the blanket has been disconnected and the PTC device allowed to cool.

FIG. 4 illustrates such an electrical system for an electric blanket in which a PTC device is used in accordance with this invention. In FIG. 4 there is a power circuit, 17, and a control circuit, 18. The power circuit, 17, comprises a blanket heating wire, 19, which extends throughout the area of the blanket to be heated. A PTC device, 20, is in the power circuit in series with heating wire, 19. The control circuit, 18, comprises a sensor wire, 21, two diodes, 22 and 22a, and two resistors, 23 and 23a. The sensor wire, 21, is separated from the heating wire, 19, by an insulative material which has a negative temperature coefficient of resistance such that when any portion of the blanket overheats the material becomes conductive and permits significant current to flow from the heating wire, 19, to the sensor wire, 21, and thus through the control circuit, 18. PTC device, 20, is thermally coupled to resistors 23 and 23a, by thermal coupling means 24 and 24a. When the blanket is in use, power circuit, 17, is connected to an alternating current power source. Current flows through the heating wire, 19, and the PTC device, 20. The PTC device will be selected such that at normal operating temperatures it will be in a low resistance state. Diodes, 22 and 22a, prevent current from flowing from the power circuit through resistors, 23 and 23a, of the control circuit under normal operating conditions of the blanket. When any portion of the blanket overheats, the insulative material separating the heating wire 9, from sensor wire, 21, becomes conductive permitting current to flow to the sensor wire and through the control circuit, including resistors 23 and 23a. Heat generated by the flow of current through resistors, 23 and 23a, is transferred by thermal coupling means, 24 and 24a, to PTC device, 20, causing the PTC device to heat and thus to change to a high resistance state. In the high resistance state, the resistance of the PTC device is sufficiently high to significantly reduce current through the power circuit and prevent overheating of the blanket. The PTC device will remain in the high resistance state until it has cooled or, in the case of some PTC devices, until the source of power has been disconnected and the device has cooled. It is preferred to use a PTC device which will remain in the high resistance state until disconnected from the power source and permitted to cool.

The invention is further illustrated by the following examples.

EXAMPLE 1

This Example simulates the behavior of a PTC device and a pair of resistors thermally coupled thereto when an electrical system as in FIG. 1 is subject to a fault condition resulting from overheating of a part of the heating blanket. The PTC device was placed in a power circuit which also included a 230 volt AC power source and a 400 ohm. resistor (equivalent to the heating wire of the blanket), the current in the circuit being 0.575 amp. The resistors thermally coupled to the PTC device were connected in parallel in a control circuit including a 27 volt DC power source and a variable resistor so that the current through the resistors could be varied to produce the desired level of power consumption therein.

The PTC device consisted of a PTC element in the form of a disc 1.9 cm in diameter and 0.2 cm thick, with an electrode of nickel-plated copper mesh embedded in each face. The PTC element was composed of a dispersion of carbon black in a blend of high density polyethylene and an ethylene/acrylic acid copolymer. The resistance of the PTC device in its low resistance state was 0.1 ohm and in its high resistance state was about $10^6$ ohm. The PTC device was encapsulated with epoxy resin or unencapsulated, as indicated for each test.

Seven different tests were carried out, using different resistors in the control circuit and different thermal coupling means, as described below. In each test, two resistors were thermally coupled to the PTC device, one resistor on each side. In tests A and B, the resistors used were 1 watt, 1.25×0.5 cm cylindrical carbon composition resistors and the PTC devices were unencapsulated. In tests C, D, E, F and G, the resistors used were 1 watt, 1.43×0.5 cm cylindrical carbon film resistors and the PTC devices used were encapsulated.

The resistors were thermally coupled to the PTC device as follows:

Test A: The resistor was bonded to (and electrically insulated from) the PTC adhesive by an epoxy resin.

Test B: A strap of copper foil, 2.2×0.6×0.025 cm, was placed on each side of the PTC device so that it encircled the resistor and extended onto the surface of the PTC device. The strip and resistor were bonded to (and electrically insulated from) the PTC device with epoxy resin.

Test C: The resistors were attached as in Test B, and the entire unit was encapsulated with an epoxy resin.

Test D: Copper straps were positioned as in Test B. The two ends of each strap were bonded to the PTC device with epoxy resin, and thermal grease (a silicone resin containing a heat conductive filler) was applied to all interfaces between the copper strap, the resistor and the PTC device.

Test E: Copper straps were positioned as in test B and epoxy resin was applied to all interfaces between the copper strips, resistors and PTC device.

Test F: The PTC device and the resistors were encircled with a band of heat shrinkable polyethylene. Thermal grease was placed at the interfaces between the resistors and the PTC device. The band was heat shrunk to securely hold the resistors in contact with the PTC device.

Test G: The resistors were bonded to the PTC device with a small amount of epoxy resin and thermal grease was applied to the interfaces between the resistors and the PTC device.

In each test, the following Procedures 1 and 2 were followed.

Procedure 1

The control circuit was adjusted so that each resistor was consuming about 2 watts (current about 140 milliamps). The control circuit was disconnected as soon as the PTC device had tripped and the trip time was recorded. The power circuit was disconnected and the device allowed to cool before Procedure 2 was followed. The resistors did not suffer any damage in this procedure in any of the Tests.

Procedure 2

One of the resistors in the control circuit was disconnected and the circuit was adjusted so that the remaining resistor was consuming about 7.5 watts. The control circuit was disconnected as soon as the PTC device had tripped and the trip time was recorded. The resistance of the resistor was measured, and it was found that in tests A, F and G the resistance had dropped, from 100 ohms to 90 ohms in Test A and from 100 ohms to 97 ohms in Tests F and G. In Test F the heat-shrunk band smoked and split open during Procedure 2, and in Test G the epoxy joint failed during Procedure 2.

Table I below shows the trip times (in minutes) recorded during the tests

TABLE I

| Test | A | B | C | D | E | F | G |
|---|---|---|---|---|---|---|---|
| Procedure 1 | 1.9 | 1.5 | 2.9 | 2.8 | 3.3 | 4.7 | 4.7 |
| Procedure 2 | 1.1 | 0.7 | 1.4 | 1.2 | 1.6 | 2.0 | 2.1 |

Comparison of Tests A and B

In each of Test A and B, an unencapsulated PTC device is thermally coupled to a carbon composition resistor. The results show that in Test B where a metal strap was used as thermal coupling means, the PTC device tripped more quickly than in Test A where a metal strap was not used. Further, in Procedure 2, use of the metal strap in Test B protected the resistor from damage, while in Test A the resistor suffered some damage.

Comparison of Test C, D, E, F and G

In each of Test C, D, E, F and G a PTC device encapsulated in epoxy resin is thermally coupled to a carbon film resistor. In these tests the effectiveness of the metal strap as thermal coupling means is also demonstrated. The trip times for Tests C, D, and E are significantly faster than for Tests F and G where a metal strap was not used. Further, the metal strap protected the resistors from damage during Tests C, D and E. During Procedure II, irreparable damage was suffered by the resistors used in Tests F and G.

EXAMPLE 2

This example illustrates the heat transfer efficiency of a metal strap thermally coupling a resistor to a PTC device. The example also demonstrates the extent of surface area contact between the metal strap and the PTC device needed for adequate heat transfer to trip the PTC device and to prevent overheating the resistor.

A PTC device was coupled to a resistor with a copper strap as in Example 1. The surface area of the PTC device and the surface area in contact with metal strap was measured. The percent of PTC surface area in contact with the strap was calculated. The PTC device and the resistor were connected in an electric circuit in series with each other. (This circuit is not in accordance with the electrical system of this invention but was used merely to evaluate the heat transfer efficiency of the metal strap). The minimum current necessary to cause the PTC device to trip, i.e. to change to a high resistance state, was determined by varying the current through the circuit until this current was reached. The current and the time required for the PTC device to trip are recorded in Table II. The power through the PTC device and resistor was calculated by the formula $P=I^2R$. This power is recorded in Table II. The temperature of the resistor was measured by placing a thermocouple next to the resistor. The experiment was repeated using metal straps of different lengths. The results are recorded in Table II and compared to results obtained when no metal strap was used.

These results show that a metal strap making contact with about 7% of the PTC surface area has about the same efficiency as straps contacting greater surface area in transferring adequate heat to the PTC device to cause it to trip. This is shown by the same current and power requirements to cause the PTC device to trip. To prevent the resistor heating to above 150° C., the strap should contact more than 7.6% of the PTC surface area. When no metal strap is used, more power is required to cause the device to trip, thus indicating inadequate heat transfer to the PTC device. Also, the resistor temperature reached 291° C., indicating inadequate heat transfer away from the resistor.

TABLE II

| Test | PTC Surface contacted by strap (%) | PTC Trip Conditions Current (ma) | PTC Trip Conditions Power (watts) | PTC Trip Conditions Time (sec) | Resistor Temp (°C.) |
|---|---|---|---|---|---|
| 1 | 36 | 180 | 2.95 | 524 | 121 |
| 2 | 23 | 180 | 2.95 | 561 | 119 |
| 3 | 7.6 | 180 | 2.95 | 514 | 183 |
| 4 | 0 | 220 | 4.40 | 524 | 291 |

We claim:
1. An electrical system comprising:
   (a) a power circuit comprising a load, a PTC device connected in series with the load and means for connecting the power circuit to a direct current or alternating current power source; and
   (b) a control circuit which includes at least one resistive heating element and the current through which becomes significant when a fault condition occurs in the power circuit;
said PTC device being in a low temperature low resistance state under normal steady state operating conditions of the system and being thermally coupled to said resistive element by a metal strap which at least partially encircles said resistive element and extends over at least a portion of the surface of said PTC device, the PTC device and the resistive element being such that
   (1), when the power circuit is connected to a power source and a fault condition develops in the power circuit, current flowing through the control circuit causes heating of said resistive element, and the heat generated by said resistive element rapidly raises the temperature of the PTC device, causing the PTC device to change to a high resistance state thus substantially reducing the current through said load in the power circuit; and
   (2) when said fault condition is removed and the power circuit is disconnected from the power source, the PTC device cools to a low temperature, low resistance state, and reconnection of the power circuit results in restoration of normal steady state operating conditions.
2. An electrical system in accordance with claim 1 wherein said metal strap extends over at least about 7 percent of the surface of said PTC device.

3. An electrical system in accordance with claim 1 wherein said metal strap extends over at least about 20 percent of the surface of said PTC device.

4. An electrical system in accordance with claim 1 wherein said PTC device comprises a conductive polymer PTC element and at least two electrodes in electrical contact with said PTC element such that current through the device flows from one electrode to another through at least a portion of said PTC element.

5. An electrical system in accordance with claim 4 wherein said conductive polymer PTC element comprises a polymer containing dispersed therein conductive particles selected from carbon black and metal powders.

6. An electrical system in accordance with claim 5 wherein said conductive particles consist essentially of carbon black.

7. An electrical system in accordance with claim 4 wherein said PTC device comprises two mesh electrodes embedded in a conductive polymer PTC element comprising a dispersion of carbon black in a blend of high density polyethylene and an ethylene/acrylic acid copolymer.

8. An electrical system in accordance with claim 1 wherein current flows in said control circuit only when a fault condition occurs in the power circuit.

* * * * *